Nov. 3, 1959   R. A. MAGNUSON   2,911,209
HIGH PRESSURE PNEUMATIC CYLINDER
Filed March 20, 1957
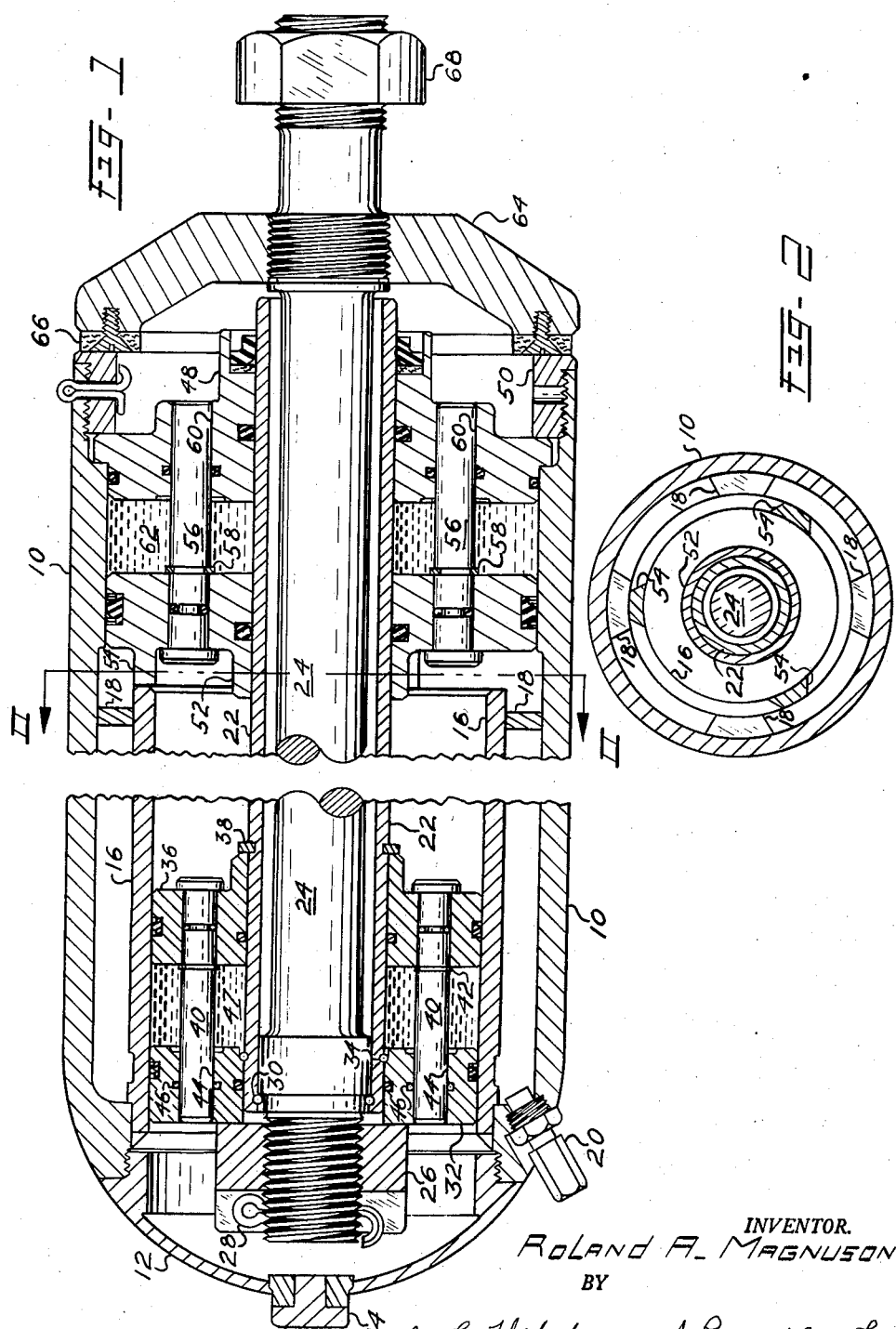
INVENTOR.
Roland A. Magnuson
BY
W. E. Thibodeau, T. J. Lynch & R. M. Lyon

United States Patent Office 2,911,209
Patented Nov. 3, 1959

2,911,209

HIGH PRESSURE PNEUMATIC CYLINDER

Roland A. Magnuson, Seattle, Wash., assignor to the United States of America as represented by the Secretary of the Army Application March 20, 1957, Serial No. 647,459

5 Claims. (Cl. 267—65)

The invention relates to high pressure pneumatic cylinders, and particularly to pneumatic cylinders utilizing fluid seals.

The compressible character of gases make gas highly desirable for use as a shock absorber, dash-pot and other devices of similar nature wherein impacts, shocks and other sudden forces are cushioned by compressing high pressure gas by means of a piston and cylinder arrangement. The advantages of gases as shock absorbers have not been fully exploited as the high momentary pressures exerted on the gas cause the gas to leak past conventional sealing means rendering extended cyclic operation inconsistent and eventually inoperative.

To provide an efficient seal for pneumatic cylinders, it is contemplated to use a seal utilizing fluid to prevent escape of the gas. Since the density of water, oil and other fluids is much greater than a gas, the problem of effectively sealing fluids is accomplished by relatively simple seals such as O-rings, T-rings and other resilient members, therefore, if the sealing of the gas can be accomplished by changing the problem to the sealing of fluid, the sealing problem will become simplified.

It is thus an object of the invention to accomplish the sealing of high pressure gas by using a fluid seal. The sealing of the gas is performed by the use of a pair of pistons, one fixed and the other free, with different pressure areas on opposite sides thereof. The pistons are arranged with a space between them which is filled with fluid. Gas pressure acting on the largest area of the free piston tends to compress the fluid. Because of the difference in the free piston face areas, the fluid pressure will become greater than the gas pressure causing any leakage past the free piston to be from the fluid towards the gas thereby preventing escape of the gas.

Another object of the invention is to design a pneumatic cylinder utilizing fluid seals in both the piston and the piston rod sealing means.

A further object of the invention is to produce a fluid seal for a pneumatic cylinder which will automatically compensate for any loss of fluid and will automatically maintain a fluid pressure greater than the gas pressure.

Yet another object of the invention is to produce a fluid seal for a pneumatic cylinder which will provide lubrication for the moving parts of the cylinder using the same fluid for sealing and lubricating.

These and other objects of the invention will become apparent when reviewed with regard to the following description and accompanying drawings wherein:

Fig. 1 is a semicross-sectional view of a cylinder illustrating the invention.

Fig. 2 is a cross-sectional view taken along the line II—II of Fig. 1.

One type of pneumatic cylinder used to illustrate the structure of the invention is shown in Fig. 1 and takes the form of a counter recoil cylinder as used with large caliber artillery. This type of cylinder is subjected to gas pressures in excess of 2000 p.s.i. and must be dependable and consistent in operation.

The cylinder assembly consists of an outer tubular shell 10 which is internally threaded at each end whereby a cap 12 may be screwed onto the left end of shell 10 (Fig. 1) enclosing the same. A relief valve 14 is threaded into cap 12 to permit back pressure on the piston to be relieved as will be later apparent. The cylinder 16 is concentrically supported within shell 10 by a press fit at the left end and a series of spacers 18 at the other end. A charge valve 20 communicates with the void between shell 10 and cylinder 16 and serves to introduce the gas into the assembly.

The piston rod assembly consists of two parts, namely, a guide tube 22 and the piston or tension rod 24. The inner end of rod 24 is threaded to receive nut 26 and drilled to provide for locking cotter pin 28. A retaining ring 30 coacts between a shoulder on rod 24 and tube 22 preventing relative longitudinal movement between these elements.

The fixed piston 32 is of an annular configuration fitting within the space between cylinder 16 and tube 22. A retaining ring 34 coacting with recesses in tube 22 and piston 32 will position piston 32, which is locked in place by abutment with nut 26. The free piston 36 is spaced from fixed piston 32 and slidingly engages guide tube 22 and the inner wall of cylinder 16. A snap ring 38 coacts with a recess in tube 22 to limit movement of piston 36 along the tube. A pair of headed pins 40 are fastened to piston 36 by snap rings 42 and extend into bores 44 formed in the fixed piston 32. Pins 40 slidingly engage bore 44 and a fluid-tight connection is insured by seal 46. Conventional O-rings and T-rings are used on pistons 32 and 36 to seal a fluid, preferably oil, within the chamber 47 between fixed piston 32 and free piston 36.

The guide tube sealing means consists of elements functionally equivalent to the piston seal. As seen in Fig. 1, the fixed piston 48 encloses the space between shell 10 and tube 22, is held in position by the annular threaded collar 50 which screws into threads formed in shell 10. The free piston 52 is spaced inwardly from piston 48 and abuts the end of cylinder 16 through three projections 54 enabling gas to flow freely from cylinder 16 to the chamber between shell 10 and cylinder 16. Free piston 52 slidingly engages tube 22 and is provided with pins 56 fixed by snap rings 58. As with the piston sealing means, the pins 56 project into bores 60 in the fixed piston 48. Suitable sealing rings are provided and the chamber 62 is filled with oil.

Piston rod 24 threadedly supports a stop 64 which abuts collar 50 through a resilient shock plate 66. The outer end of rod 24 is threaded and provided with lock nut 68 whereby the tension rod and piston may be connected to the operating mechanism of the gun.

The operation of the cylinder assembly is as follows:

The assembly is charged by introducing a compressed gas into the interior of shell 10 through the charge valve 20. Nitrogen is preferred for its inert and non-corrosive characteristics. The gas will flow past the spacers 18 and into the cylinder 16. The chambers 47 and 62 have been filled with oil and the free pistons 36 and 52 will be in the positions shown in Fig. 1.

When the piston rod 24 is pulled suddenly to the right, the pistons 32 and 36 will slide within cylinder 16 compressing the gas therein and in the void between shell 10 and cylinder 16. As the original gas pressure within the assembly may be 2000 p.s.i., the gas pressure during the compression stroke will be very high, and there will be a tendency for the gas to leak past the pistons 32, 36, 48 and 52, however, leakage is prevented by the action of the fluid within chambers 47 and 62. The gas pressure acting on the gas side of free piston 36 will tend to force the piston 36 to the left along tube 22 compressing the fluid within chamber 47. The fluid, being sealed within chamber 47, will thereupon create an internal pressure force sufficient to prevent movement of the piston 36. Thus, the forces acting on the gaseous and fluid sides of piston 36 will equalize. However, as the pins 40 extend completely through the fluid chamber 47, the effective pressure area on the fluid side of piston 36 will be less than the pressure area of the gas side of the piston 36 by the area of the cross sections of pins 40, therefore the fluid pressure must be greater than the gas pressure in order to equalize the force acting on the piston 36. As the fluid pressure is greater than that of the gas within cylinder 16, any leakage past piston 36 will be from the fluid to the gas sides thereby preventing loss of the gas.

The O-ring and T-ring seals used on pistons 32 and 36 will prevent excessive escape of the fluid, and the nut 26 and retaining ring 34 keeps the fixed piston 32 locking in the proper position on guide tube 22. After many cycles of operation, there will be a gradual loss of the fluid within chamber 47 due to leakage past the seals, however, a fluid loss does not affect the operation of the seal because the free piston 36 will automatically move toward the fixed piston 32 due to the reduced volume of chamber 47 caused by the loss of oil and the gas pressure on piston 36. As relative movement between pistons 32 and 36 takes place, the pins 40 extend further into bores 44 and will project beyond the free piston 36.

The pistons 48 and 52 function in a manner similar to that described above to seal the other end of the assembly. Gas pressure acting on the left side of free piston 52 builds up a greater fluid pressure within chamber 62 because of the differential piston area caused by pins 56, thus any leakage past piston 52 will be of fluid flowing toward the gas chamber. As fixed piston 48 is firmly held in position by collar 50, there will be a negligible loss of fluid from chamber 62 past the piston 48. It will be appreciated that the fluid within chambers 47 and 62 will lubricate the guide tube 22 and cylinder 16, respectively, insuring maximum O-ring and T-ring seal life.

The use of guide tube 22 also contributes to increasing the seal life by preventing lateral deflections imposed upon piston rod 24 from subjecting the seals of the fixed and free pistons to unequal radial forces. Since the piston rod 24 engages the guide tube 22 at the innermost end only, lateral deflections of rod 24 will not be transferred to tube 22 which will always reciprocate in a path coaxial with cylinder 16 and shell 10.

Release of the force acting on rod 24 to compress the gas within cylinder 16 will permit the gas to move pistons 32 and 36, rod 24 and guide tube 22 to the left, and this motion is limited by the stop 64 and shock plate 66 contacting collar 50.

In the illustrated embodiment of the invention, the chambers 47 and 62 are charged with oil during the assembly of the entire unit and need not be refilled until all of the fluid within one of the chambers has become exhausted. By proper design of seals, tolerances and volumes, the fluid seal will remain effective until overhaul of the assembly is due. For example, overhaul and service of counter recoil cylinders for large artillery pieces is 15,000 cycles, and extensive tests have proven that the recoil cylinder of the invention will perform 15,000 cycles of operation at 2000 p.s.i. without measurable gas pressure loss. It is contemplated, however, that with cylinders of exceptional long major service periods plugs or valves may be provided in the fixed pistons 32 and 48 whereby the fluid within chambers 47 and 62 may be replenished without major disassembly.

It will be thus understood that the invention utilizes a free differential piston to produce a fluid pressure greater than the gas pressure thereby sealing gas by means of a fluid counter pressure. Loss of sealing fluid is automatically compensated for and the construction is self-lubricating.

Various modifications to the disclosed embodiments may be apparent to those skilled in the art without departing from the spirit and scope of the invention, and it is intended that the invention be defined only by the scope of the appended claims.

I claim:

1. A high pressure pneumatic cylinder assembly comprising, in combination, an outer tubular shell enclosed at one end thereof, a cylinder supported within said shell in spaced concentric relationship thereto extending from a point adjacent said one end and for a portion of the length thereof, a piston rod guide tube within said shell and said cylinder in spaced concentric relationship thereto, a piston rod concentrically within said guide tube extending therethrough and projecting from the other end of said shell, a first piston assembly between said cylinder and guide tube adjacent said one end of said shell, a guide tube sealing second piston assembly between said guide tube and said shell adjacent said other end thereof and spaced from said first piston assembly to define a closed space containing a gas under high pressure, said first piston assembly including an annular first fixed piston interposed between said cylinder and said guide tube affixed for movement with said piston rod, an annular first free piston slidably supported on said guide tube and spaced axially from said first fixed piston defining a first chamber between said first fixed piston and one side of said first free piston, the other side of said first free piston partially defining said closed space, and differential pressure areas on the opposite sides of said first free piston, said second piston assembly including a second annular fixed piston interposed between said shell and said guide tube, a second annular free piston between said shell and said guide tube slidably supported on the latter and spaced axially from said second fixed piston defining a chamber between said second fixed piston and one side of said second free piston, the other side of said second free piston partially defining said closed space, and differential pressure areas on the opposite sides of said second free piston, and fluid lubricant filling each of said chambers.

2. A high pressure pneumatic cylinder assembly comprising, in combination, an outer tubular shell enclosed at one end thereof, a cylinder supported within said shell in spaced concentric relationship thereto extending from a point adjacent said one end and toward the other end of said shell, a piston rod guide tube within said shell and within said cylinder in spaced concentric relationship thereto, a piston rod concentrically within said guide tube extending therethrough and projecting from the other end of said shell, a first piston assembly between said cylinder and guide tube and having a portion thereof drivingly engaged by said piston rod at one end thereof adjacent said one end of said shell, a guide tube sealing second piston assembly between said guide tube and said shell adjacent said other end thereof and axially spaced from said first piston assembly to define a closed space for confining gas under high pressure, said first piston assembly including an annular first fixed piston interposed between said cylinder and said guide tube affixed for movement with said piston rod, an annular first free piston slidably supported on said guide tube and spaced axially from said first fixed piston defining a first chamber between said first fixed piston and one side of said first free piston for confining fluid lubricant, the other side of said first free piston partially defining said closed space, and means establishing differential pressure areas on the opposite sides of said first free piston, said second piston assembly including a second annular fixed piston interposed between said shell and said guide tube adjacent said other end of said shell, a second annular free piston between said shell and said guide tube slidably supported on the latter and spaced axially from said second fixed piston defining a second chamber between said second fixed piston and one side of said second free piston for confining fluid lubricant, the other side of said second free piston partially defining said closed space, and means establishing differential pressure areas on opposite sides of said second free piston, and a stop member on said piston rod engaging said other end of said shell.

3. A high pressure pneumatic cylinder assembly as set forth in claim 2, wherein said means for establishing differential pressure areas on opposite sides of said first and second free pistons includes separate pins carried by said first and second free pistons extending through said first and second chambers respectively and slidable in bores of said first and second fixed pistons respectively.

4. A high pressure pneumatic cylinder assembly as set forth in claim 2, including a charge valve in said shell for introducing gas under high pressure to said closed space.

5. A high pressure pneumatic cylinder assembly as set forth in claim 2, including conventional sealing rings for said pistons.

References Cited in the file of this patent

UNITED STATES PATENTS

| | | |
|---|---|---|
| 2,159,855 | Laugaudin | May 23, 1939 |
| 2,308,149 | Bingham | Jan. 12, 1943 |
| 2,595,426 | Thornhill | May 6, 1952 |
| 2,737,384 | Laugaudin | Mar. 6, 1956 |

FOREIGN PATENTS

| | | |
|---|---|---|
| 641,527 | Great Britain | Aug. 16, 1950 |